(12) United States Patent
Leveson

(10) Patent No.: US 7,569,204 B2
(45) Date of Patent: Aug. 4, 2009

(54) APPARATUS AND METHOD FOR CONTROLLING THE GAS COMPOSITION PRODUCED DURING THE GASIFICATION OF CARBON CONTAINING FEEDS

(75) Inventor: Philip D. Leveson, Hannawa Falls, NY (US)

(73) Assignee: Zeropoint Clean Tech, Inc., Potsdam, NY (US)

( * ) Notice: Subject to any disclaimer, the term of this patent is extended or adjusted under 35 U.S.C. 154(b) by 0 days.

(21) Appl. No.: 11/678,981

(22) Filed: Feb. 26, 2007

(65) Prior Publication Data

US 2007/0270513 A1    Nov. 22, 2007

Related U.S. Application Data

(60) Provisional application No. 60/777,165, filed on Feb. 27, 2006.

(51) Int. Cl.
  *C01B 31/18* (2006.01)
  *C01B 3/24* (2006.01)
  *F23G 5/12* (2006.01)
  *C10J 1/28* (2006.01)

(52) U.S. Cl. .......... 423/418.2; 423/650; 110/229; 48/197 R; 518/702

(58) Field of Classification Search .......... 110/229; 48/197 R; 518/700, 702; 423/418.2, 650
See application file for complete search history.

(56) References Cited

U.S. PATENT DOCUMENTS

| 4,004,896 | A | 1/1977 | Soo |
| 4,306,506 | A | 12/1981 | Rotter |
| 4,583,992 | A | 4/1986 | Rogers |
| 4,929,254 | A | 5/1990 | Kooiman et al. |
| 5,554,453 | A | 9/1996 | Steinfeld et al. |
| 6,615,748 | B2 | 9/2003 | Sunter et al. |
| 6,647,903 | B2 | 11/2003 | Ellis |
| 2002/0095866 | A1* | 7/2002 | Hassett .......... 48/199 FM |
| 2003/0083390 | A1* | 5/2003 | Shah et al. .......... 518/702 |
| 2004/0013605 | A1 | 1/2004 | Ramani et al. |
| 2005/0204969 | A1* | 9/2005 | Capote et al. .......... 110/341 |

OTHER PUBLICATIONS

Search Report for International Patent Application No. PCT/US2007/062861; Oct. 1, 2007.

Spath et al.; Preliminary Screening—Technical and Economic Assessment of Synthesis Gas to Fuels and Chemicals with Emphasis on the Potential for Biomass-Derived Syngas; National Renewable Energy Laboratory; Dec. 2003; pp. 1-143.

Zimmerman et al.; On-line monitoring of traces of aromatic-, phenolic- and chlorinated components in flue gases of industrial scale incinerators and cigarette smoke by direct-inlet laser ionization-mass spectrometry (REMPI-TOFMS); Fresenius' Journal of Analytical Chemistry; Apr. 1999; vol. 363, No. 8; pp. 720-730 (Abstract Only).

* cited by examiner

*Primary Examiner*—Jafar Parsa
(74) *Attorney, Agent, or Firm*—Charles L. Warner; Bryan Cave LLP

(57) ABSTRACT

A method for controlling the output composition from a gasification device for use in the gasification of biomass using a gasifier in which the biomass and gas both flow in a downward direction. The method combines the use of steam and oxygen as a mixed oxidation stream to control the processes occurring within the gasifier. The oxidants are introduced into the gasifier using a number of injection rings. Each injection ring is comprised of a number of injection nozzles each radially distributed at the same vertical height and possibly connected to the same supply source. Particularly satisfactory results can be achieved through the use of three injection rings, one at the top of the gasifier, one at the interface of the oxidation and reduction zone and one a small distance below the grate assembly. The produced syngas also contains extremely low concentrations of tar and low molecular weight hydrocarbons.

8 Claims, 2 Drawing Sheets

APPARATUS AND METHOD FOR CONTROLLING THE GAS COMPOSITION PRODUCED DURING THE GASIFICATION OF CARBON CONTAINING FEEDS

CROSS-REFERENCE TO RELATED APPLICATION

This application claims benefit of copending U.S. provisional patent application No. 60/777,165, filed Feb. 27, 2006, entitled METHOD TO CONTROL THE GAS COMPOSITION PRODUCED DURING THE GASIFICATION OF CARBON CONTAINING FEEDS, and commonly assigned to the assignee of the present application, the disclosure of which is incorporated by reference in its entirety herein.

FIELD OF THE INVENTION

The present invention relates to a method for producing syngas where oxygen or air in combination with steam are used to gasify carbon containing solids in a controllable manner. More particularly, the present invention relates to a method for controlling the ratio of hydrogen to carbon monoxide produced in the gasification process.

BACKGROUND OF THE INVENTION

The world currently consumes around 83 million barrels of oil each day. This figure is projected to reach around 120 million barrels per day by 2010. It is also estimated that the world production of oil will begin to decline at some point in the next 30 years. The increased demand and slowing of production will begin to generate an oil shortage.

Once the point is reached where supply cannot meet demand market forces will dictate that the price will rise. Some estimates claim the price of oil may double every five years after the point of peak production. The inevitable price increase makes the use of biomass as an alternative energy particularly attractive. The abundance of biomass is sufficient to offset a significant fraction of the worlds current energy needs. Biomass can be used directly through combustion to produce heat and power. However, there remain issues relating to distribution of the biomass, local handling of the biomass and the combustion issues such as long startup times of such systems. One way to avoid such problems is to convert the biomass into a liquid fuel. This approach also has the tremendous advantage that the current fuel distribution infrastructure can still be utilized. Suitable liquid fuels include methanol, ethanol, dimethylether (DME) and FT syncrude. The biomass is converted to the fuel at a central facility and the liquid product is distributed via the current fuel distribution network.

The most common process to convert biomass into liquid fuels consists of two steps. In the first the biomass is converted into a mixture of carbon monoxide and hydrogen. The process is called gasification and the gaseous mixture produced is often referred to as "Syngas". Biomass gasification can be broadly summarized as:

$$CH_{1.4}O_{0.6} + 0.2O_2 = CO + 0.7H_2 \tag{1}$$

However an energy balance across the Equation 1 reveals that the products contain more energy than the reactants, hence some of the biomass is burnt to offset this imbalance. Equation 1 illustrates how the typical ration of carbon monoxide to hydrogen is close to 1:1.

In the second stage the carbon monoxide and hydrogen are compressed and passed over a suitable catalyst. The reactions which convert the syngas to liquid fuels are exothermic so the reactor in which the process occurs has to have suitable facilities to remove this heat of reaction. The reactions producing methanol, ethanol, dimethylether and FT syncrude are shown below:

$$2H_2 + CO \rightarrow CH_3OH \tag{2}$$

$$4H_2 + 2CO \rightarrow CH_3CH_2OH + H_2O \tag{3}$$

$$4H_2 + 2CO \rightarrow CH_3OCH_3 + H_2O \tag{4}$$

$$2nH_2 + nCO \rightarrow n\text{-}CH2\text{-} + nH_2O \tag{5}$$

It is interesting to note that for all of the reactions a hydrogen to carbon monoxide ratio of 2:1 is stoichiometrically required. If the syngas produced through direct gasification (i.e., with a CO to $H_2$ ratio close to 1:1) is used directly the reaction will not proceed to completeness as hydrogen will become limiting. At best this result in a yield loss; however, many of catalysts used in the transformations are likely to suffer from carbon deposition resulting in reduced activity. To maximize the yield from the process it is important that the hydrogen to carbon monoxide ratio be controlled to match the stoichiometry of the liquefaction process. One method in which this can be completed is via the water gas shift reaction:

$$CO + H_2O = CO_2 + H_2 \tag{6}$$

in which CO can be stoichiometrically interchanged with $H_2$. This approach has been successfully used; however, the approach inevitably leads to a substantially mass loss of reactants, as carbon monoxide with a weight of 28 g/mol is used to produce hydrogen with a weight of 2 g/mol.

A number of US patents have been directed to apparatus suitable for the gasification of biomass. U.S. Pat. No. 4,583,992 issued to C. D. Rogers describes a gasification apparatus consisting essentially of an upright cylindrical downdraft gasifier upon which the gasification material is supported upon a rotational grate. The gasification apparatus is continuously fed into the vessel through an aperture situated on the top of the apparatus. Combustion air is supplied through a central pipe, originating at the top of gasifier, and which has outlets at various locations within the bed. This central pipe further proceeds through the bed and is attached to the grate. The central pipe is rotated to allow means for the rotation of the bed grate. Through the control of the rate of rotation of the grate the fraction of material exiting the system in the form of activated carbon is controlled. Rogers does describe a system suitable for the gasification of biomass and for the production of charcoal but does not teach of a method in which the composition of the outlet stream can be controlled.

U.S. Pat. No. 4,306,506 issued to F. Rotter describes a gasification apparatus consisting of a vertical cylindrical downdraft gasifier, in which the lower section is of double shell construction. In the inner section gasification processes, consisting of drying, distillation, oxidation and reduction occur. The bottom of the gasification section is comprised of a cone such that the local superficial velocity is increased to aid in heat and mass transfer. After passing through a grate the syngas is passed in an upward direction through the annulus created by the double shell construction. Here heat is transferred from the syngas exiting the system to the gasification processes occurring in the inner section, thus improving the thermal efficiency of the process and avoiding the need for an external heat exchange device. The apparatus is designed such that the inner section is hanging within the outer section and thus allowed to thermally expand as desired. This arrangement is said to prevent the build up of harmful stresses with in the structure. The patent issued to Rotter does teach of a downdraft gasifier design in which heat is recovered within the gasifier apparatus but the patent does not teach of a method in which both oxygen and steam and introduced through a multi-injection array to control the processes occurring within the gasifier.

U.S. Pat. No. 4,929,254 issued to C. A. Kooiman relates to a gasification system for the production of a clean combustible products form solid fuel material. The apparatus is a down draft gasifier and consists of vertically orientated apparatus having an uppermost portion which comprises a hopper for the delivery of feedstock. An air tight locking device is used to separate the top of the gasifier from the feed hopper. The vertical chambers of the gasifier comprise a first drying chamber and intermediate and lower gasification chambers. The chambers are modular units which vertically align. Air inlets are present in the intermediate chamber through which the oxidant is introduced. At the bottom of the lower chamber a grate is located to support the bed. An outlet is also located within this bottom section such that the process gas can be removed from the apparatus. Kooiman also teaches of a number of external operations, consisting of quenchers, scrubbers and filters which lead to the production of a clean syngas. The patent does not teach of a system in which oxidants and steam are injected below the grate arrangement to promote the oxidation and reformation of tars and low order hydrocarbons.

U.S. Pat. No. 004,896 issued to S. L. Soo teaches of a method of steam reforming of a carbon containing feedstock. In the method excess steam is generated in a packed superheater before being contacted with the carbon containing feed. The patent teaches that by using steam in excess by a factor of 2-10 that all of the heat of reaction of steam gasification can be supplied by the sensible heat contained in the steam. Furthermore the patent teaches that by the careful control of the amount of the steam that the composition of the output ratio of carbon monoxide to hydrogen can be controlled. Through the use of a large excess of steam a stream composed of 90% hydrogen can be produced. The technique is applicable to both batch and continuous processes. However, the patent does not teach how through the use of combinations of steam and oxygen as oxidants the syngas composition can be controlled without the need of a large excess of steam.

U.S. patent application No. 2004/0013605 applied by Ramani et al. teaches of a method to control the ratio of carbon monoxide to hydrogen in a syngas by the reformation of hydrocarbons. The patent teaches of a method where two feedstocks are selected, where the first feedstock, upon reformation, gives a higher $H_2$:CO ratio than desired and the second feedstock, upon reformation, gives a lower $H_2$:CO ratio than desired. The patent teaches how the ratio of the two feedstocks can be calculated such that the combination of products gives the ratio desired. The patent teaches that the fuels can be either combined and reformed together or the reformation carried out separately and the products of the reformations combined. The patent does not teach how the composition of a syngas stream produced from a biomass feedstock can be controlled by the combination of oxidation and steam reforming processes.

It is therefore a feature of the current invention to provide a method and apparatus for the gasification of biomass in which the ratio of carbon monoxide to hydrogen in the outlet gas is controlled. The method utilizes a combination of oxygen and water as the oxidant. The oxidants are injected at a number of locations to control the extent of oxidation and reformation processes occurring within the gasifier.

It is a further feature of the present invention to provide a design of a downdraft gasifier in which the gasifier is separated in a top section and bottom section by a grate. The grate is used to support biomass such that a bed is formed. In the top section oxygen and steam are injected into the biomass to initiate the drying, distillation, oxidative and reduction of biomass and biomass products. Just above the grate a bed of embers exist where significant thermal cracking and steam reforming reactions act to break down any tars produced during the pyrolysis of the biomass. Below the grate a second set of oxidant injection nozzles are present. The introduction of oxygen and steam promote a second reaction zone which allows adjustment of the syngas composition and acts to destroy any tars and low order hydrocarbons, such as methane, via a second oxidative and reformation step. The technique produces a syngas which is low in tars and methane and which maximizes the carbon monoxide and hydrogen yield from biomass.

SUMMARY OF THE INVENTION

The invention provides, in one exemplary embodiment, a method for controlling the output composition from a gasification device. The invention is particularly relevant to the gasification of biomass using a gasifier in which the biomass and gas both flow in a downward direction. The method combines the use of steam and oxygen as a mixed oxidation stream to control the processes occurring within the gasifier. The oxidants are introduced into the gasifier using a number of injection rings. Each injection ring is comprised of a number of injection nozzles each radially distributed at the same vertical height and possibly connected to the same supply source. Particularly satisfactory results can be achieved through the use of three injection rings, one at the top of the gasifier, one at the interface of the oxidation and reduction zone and one a small distance below the grate assembly. By careful choice of oxidant type, flow rate and injection location a syngas can be produced with a controllable CO:$H_2$ ratio. The produced syngas also contains extremely low concentrations of tar and low molecular weight hydrocarbons. The method can be applied to a number of gasifier designs and therefore the examples set out herein illustrate several exemplary embodiments of the invention but should not be construed as limiting the scope of the invention in any manner.

Other features and advantages of the present invention will become apparent upon reading the following detailed description of embodiments of the invention, when taken in conjunction with the appended claims.

BRIEF DESCRIPTION OF THE DRAWINGS

The invention is illustrated in the drawings in which like reference characters designate the same or similar parts throughout the figures of which.

DETAILED DESCRIPTION OF THE PREFERRED EMBODIMENTS

Two common methods are often employed to gasify biomass or other carbon containing solids. In the first, the biomass is partially combusted with oxygen, the heat of the combustion acts to fuel the endothermic reforming reactions which act to break down the remaining solid to produce the syngas. In the second, the biomass is contacted with superheated steam. The steam is either used in excess such that the required energy for the endothermic reactions is provided by the sensible heat contained in the steam or the process is externally heated. For processes utilizing direct oxidation the syngas produced has a $CO:H_2$ ratio of approximately 1:1. For systems utilizing steam as the oxidant, syngas streams which are very rich in hydrogen are produced, syngas with a $CO:H_2$ as high as 1:9 has been achieved.

Figure 1:
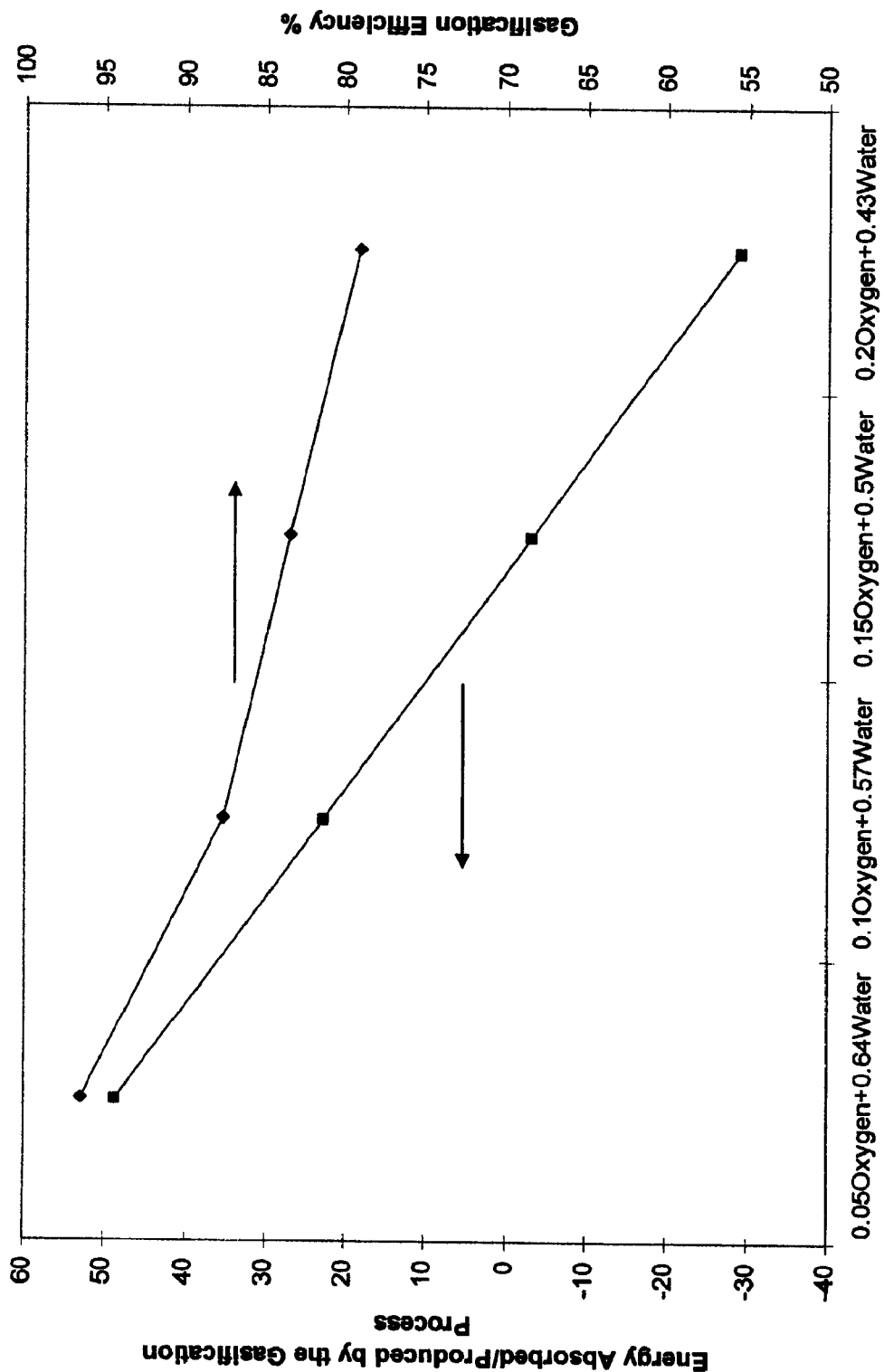
FIG. 1 is a graph showing how changing the ratios of oxygen and water as the oxidant effects the energetic nature of the process and the gasification efficiency; and, FIG. 2 is a schematic view of an exemplary downdraft gasifier of the present invention with multiple injection nozzles located above and below the grate housing.

FIG. 1 illustrates how the gasification process changes from being endothermic in nature for process utilizing high steam with low oxygen to exothermic in nature when the steam is reduced and the more oxygen is used. For all cases in FIG. 1 the net energy change of the process is calculated for a product stream containing CO to $H_2$ in the ratio 2:1. As mentioned above this ratio is the stoichiometric ratio for a number of important liquid producing reactions. Also illustrated in FIG. 1 is how the gasification efficiency is reduced as more oxygen is utilized. Here gasification efficiency is defined as the mass of syngas produced per mass of biomass consumed. All of the calculations are based on a biomass composition of $CH_{1.4}O_{0.6}$. FIG. 1 illustrates how through the use of mixed oxidants a process can be realized which is exothermic, hence, alleviating the need for large steam plants or external heating while achieving high gasification efficiencies while producing syngas streams with a $CO:H_2$ of 2:1.

Figure 2:
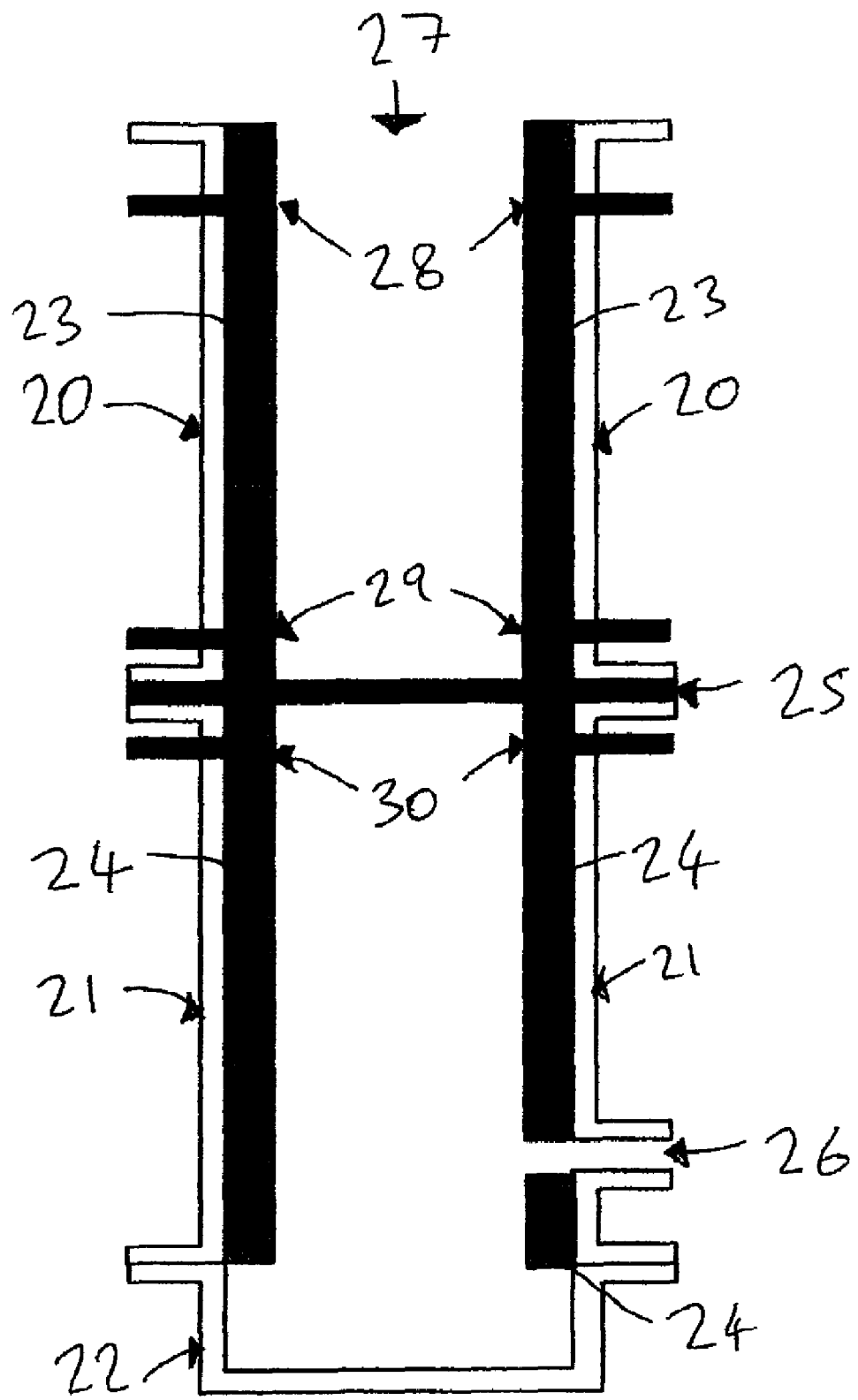

A schematic of the gasifier with multi-oxidant injections is shown in FIG. 2. The gasifier is comprised of an upper gasification chamber (31) and a lower reforming chamber (32) which are separated by a grate (25). Biomass enters the top chamber through the inlet (27) and is held by the grate (25) to form a bed. A number of methods are suitable for feeding the bed but are not shown in FIG. 2 so as to not remove clarity from the invention. The upper and lower chambers may be insulated with suitable refractory (23 and 24) which may be built in place from refractory solids such as bricks or be of a castable nature. External insulation may also be applied. The refractory is held in place by a substantially rigid outer wall (20 and 21). Within the top chamber the biomass is contacted with oxidants supplied through injection nozzles (28 and 29). Initially, oxygen reacts with the biomass to produce a flaming pyrolysis zone. Here the biomass is partially combusted to produce the heat required by the endothermic reforming processes. The biomass undergoes direct gasification due to both the oxygen and steam as well as pyrolysis and devolatization steps which may produce low molecular weight tars and hydrocarbons. The products formed during the pyrolysis stages then undergo several decomposition steps through reactions with steam and oxygen to produce the carbon monoxide and hydrogen. The product of the devolatized biomass is a carbon-rich porous ember which will undergo further oxidation and gasification reactions. The reactions of the carbon embers are somewhat slow and so these embers tend to collect above the grate where they react until they are small enough to pass through the grate. The ember bed has a beneficial effect on the overall gasification process as gaseous products passing from the upper to lower chambers have to pass through this ember bed. While passing through the bed the gases are exposed to relatively high temperatures which further instigate the decomposition of higher molecular weight products into carbon monoxide and hydrogen.

In the present invention the gases pass into a second chamber (32) where further oxidative and reforming processes occur. Further oxidant is added into this lower chamber through a further set of injectors (30). The local temperature here can be controlled by the amount of oxygen addition. In the lower chamber tars and hydrocarbon components undergo a further decomposition step. Further steam is added such that any hydrocarbons are reformed to release substantial volumes of hydrogen. Although some fuel is combusted in this stage, leading to a potential yield loss, this is more than compensated for by the extra carbon monoxide and hydrogen released from the low order hydrocarbons such as methane and tars. The technique maximizes yields while producing a syngas which is exceptionally low in tar and hydrocarbons. The overall ratio of $CO:H_2$ produced by the gasifier is controlled by the ratio and flow rate of oxygen and steam added throughout the gasifier. The lower stage also has beneficial effects upon pollutants such as ammonia and hydrogen sulphide. By controlling the temperature within the lower chamber and ensuring that it is sufficiently high then rapid thermal decomposition of both ammonia and hydrogen sulphide can be promoted. It is beneficial that both of these products release hydrogen upon decomposition however then real benefit is to relief the requirements of ancillary downstream gas clean up units.

If desirable the lower chamber can be operated in a very hot mode such that ash dropping through the grate can be melted such that the process operates with a lower slagging mode. Also any ungasified carbon will undergo further reaction in this lower chamber.

In FIG. 2 three exemplary injection stages are illustrated. These injection stages may be comprised of a number of injectors located at differing radial locations at the same gasifier height as to ensure an efficient means of introducing the desired oxidants. This is particularly important for the lower section where it is important that the syngas is rapidly mixed with the secondary oxidant injection to ensure rapid homogeneous kinetics occur. Depending on the feedstock being gasified it may be desirable to have more or less injection points and these may be comprised of any number of injection nozzles, however rings formed from five or six injection nozzles have proved to be very satisfactory. The nozzles may be supplied from the source utilizing a 'ring-main' arrangement or may be supplied from individual sources.

In FIG. 2 the grate is located to create an upper and lower chamber of essentially equal volumes. However, depending on the feedstock gasification qualities, it may be desirable to move the grate such that ratio of the upper to lower chamber volume are changed. Also for syngas products to be ultra low in tar it may be desirable to have a large lower chamber to expend time for reaction.

The ash produced through gasification passes through the grate (25) and lower gasification zone (32) and is collected in the ash collection bin (22). The ash may be removed from this collection point using either in a continuous manner using techniques well known to those skilled in the art or in a batch mode where the collection bin is sized sufficiently large that it only requires emptying at an acceptable frequency. The ash produced from the gasifier contains appreciable amounts of trace minerals and alkali metals which have accumulated in the plant matter. The ash is a saleable co-product and has uses as a fertilizer and soil pH modifier or as a concrete additive. It is believed that the ash is particularly suited for land fertilization as it contains the trace minerals initially present in the plant itself. The ash produced from gasification does not impose the potential health risks of ash produced from biomass incineration. This is due to the gasification process being conducted at low temperatures thus harmful and potential carcinogens such as phenyl derivatives and dioxins are not produced.

In a preferred exemplary embodiment the grate has a drive mechanism which allows the for grate rotation. In this case the pressure drop through the bed is continuously monitored. If the reading is excessively high it indicates plugging within the bed and the drive mechanism can be activated to remove ash from the lower section of the bed and provided some agitation. If the reading becomes very low than it indicated that bridging may be occurring. Again in this case the grate is rotated and the bed agitated to produce a more even bed.

Alternatively, the agitation to the grate may be provided through other means, including radially located vibration transducers. In this case the transducers become activated if the bed pressure drop becomes too large or small. A large pressure drop is indicative of the formation of a blockage while a low reading is due to channeling. Once activated the vibrations from the transducers are transferred to the grate either through a direct coupling or indirectly through the wall or though ports which house connecting rods.

In a further preferred exemplary embodiment the syngas stream exiting the gasifier is continuously monitored to ensure the desired $H_2$ to CO ratio is being produced. The gases can be continuously monitored using a number of techniques such as infrared spectroscopy, electrochemical cells or fast chromatography. Based upon any deviation from the desired setpoint the process is adjusted. This is primarily achieved through adjustments to the volume and type of oxidant being injected at each location. This technique offers control of many important variables including bed temperature, rate of $CO_2$ production, and rate and equilibrium of the water gas shift reaction. These variables all have a direct influence on the $H_2$:CO ratio in the produced gas.

In a further preferred exemplary embodiment the syngas exiting the gasifier passes into an economizer heat exchanger. In the arrangement the sensible heat contained within syngas is transferred to provide the energy to vaporize and superheat the incoming steam stream. It is beneficial that the steam be injected a high temperature, temperatures as high as about 1,800° F. (982° C.) are particularly useful. This arrangement leads to a significant thermal efficiency gain for the system.

Once the gas is cooled it may be desirable to feed the syngas into a low temperature water gas shift reactor such that the composition can be fine tuned. The equilibrium of the water gas shift changes with temperature such that a gas leaving the gasifier at the equilibrium dictated by the temperature there can be further adjusted at the lower temperature. This effect is particularly useful if further hydrogen production is desired.

In a further exemplary embodiment the syngas undergoes further clean up and is compressed and use in a secondary process designed to produce liquid products from syngas. The clean up may include a system designed to remove sulphur containing compounds, ammonia and hydrochloric acid to levels less than about 1 ppm. The syngas than undergoes compression, possibly with interstage cooling, before being passed into a gas to liquids reactor. The process allows the production of a number of potential fuels including, but not limited to, methanol, ethanol, dimethylether, Fischer Tropsch Syncrude and the like.

In a further embodiment any unreacted syngas or light gas produced in the gas to liquids process may be recycled to the gasifier. The offgas may be introduced into the gasifier through the oxygen and steam injectors or through a separate ring of nozzles. The offgas may be partially oxidized to produce syngas and some heat or fully oxidized to provide the total heat required by the process. The technique allows for the efficient recycling of offgas or undesirable products produced in the GTL process.

In a further exemplary embodiment the steam may be generated form any water produced in the GTL process. The water stream may contain trace quantities of organics. The technique removes a potential water disposal issue as well as efficiently recycling carbon containing compounds to produce syngas.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. It should further be noted that any patents, applications and publications referred to herein are incorporated by reference in their entirety.

The invention claimed is:

1. A process for the controlled gasification of biomass, said method comprising:
    a. providing a gasifier having an upper gasification chamber and a lower reforming chamber with a grate disposed therebetween, said grate allowing for the formation of a bed of embers, allowing gas and ash particles to pass between said chambers while preventing larger embers from passing between said chambers, and allowing for independent temperature control for said chambers;
    b. gasifying a quantity of biomass in said upper chamber using an oxidant selected from the group consisting of oxygen, steam and mixtures thereof; and
    c. adjusting the composition of said gasification stream in said lower chamber through a second addition of an oxidant selected from the group consisting of oxygen, steam and mixtures thereof.

2. The process of claim 1, wherein lower order hydrocarbons and tar are at least partially reformed or oxidized in the lower reforming chamber to produce carbon monoxide and hydrogen.

3. The process of claim 1, wherein the total oxygen used in the process is between about 5% and about 100% of the weight of the biomass feed.

4. The process of claim 1, wherein the total steam used in the process is between about 10% and about 500% of the weight of the biomass feed.

5. The process of claim 1, wherein about 50 to about 99% of the total oxidants are introduced into the upper gasification chamber.

6. The process of claim 1, wherein an online gas analysis system is used to monitor the composition of the produced syngas and then used to control the rate, type and location of oxidant injection into the gasifier.

7. The process of claim 1, wherein the gas produced is passed through an inline heat exchanger to facilitate the recovery of the sensible heat and quench the stream.

8. The process of claim 1, wherein the gas produced is passed through an inline heat exchanger in which super heated steam is generated and directed into the gasifier.

* * * * *